Jan. 31, 1956
A. A. CHUBB
2,733,298
AUTOMATIC TELEPHONE SYSTEMS
Filed Nov. 28, 1951
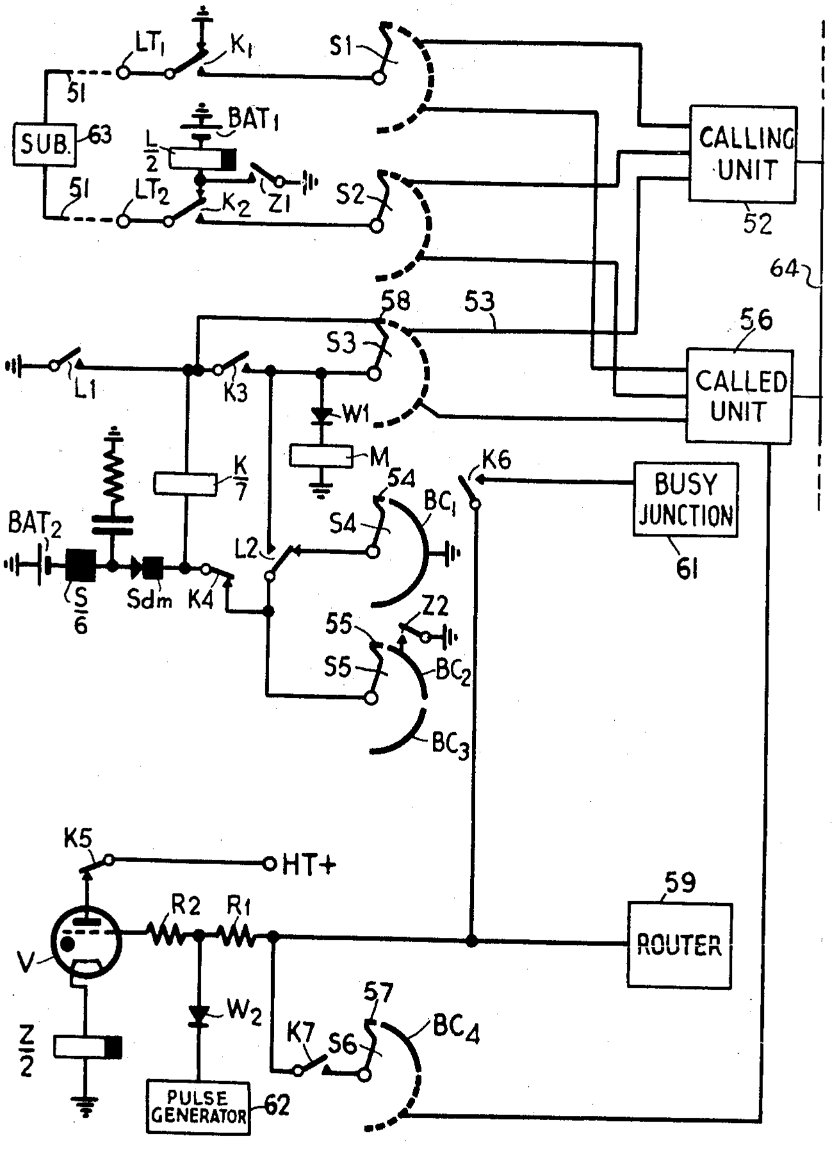
INVENTOR
ALEXANDER ALBERT CHUBB
BY
[signature]
ATTORNEY 2,733,298

AUTOMATIC TELEPHONE SYSTEMS

Alexander Albert Chubb, Coventry, England, assignor to The General Electric Company Limited, London, England Application November 28, 1951, Serial No. 258,548

Claims priority, application Great Britain November 29, 1950

10 Claims. (Cl. 179—18)

The present invention relates to automatic telephone systems and is more particularly concerned with the equipment in an automatic telephone exchange that is individual to each subscriber. Such equipment is hereinafter referred to in this specification as a "subscriber's line circuit."

It is usually required that a subscriber shall be able to initiate a call and also to be called. In a known form of automatic telephone exchange, each subscriber's line circuit comprises a step-by-step electromagnetic switch, the contact banks of a number of these switches being connected together to a group of selectors. A line circuit of this character is shown on page 209 of "Telephony," volume II, by Herbert and Proctor. With that line circuit, a calling subscriber obtains access to one of these selectors through his associated step-by-step switch although that switch is not brought into use when the subscriber is called.

In the specification of co-pending United States patent application No. 247,072 there is described an automatic telephone exchange in which the method of establishing a connection is for a subscriber initiating a call to seize an apparatus unit, referred to as a calling unit, in conjunction with a register. The latter receives the digits dialled by the subscriber and routes a calling signal to the wanted subscriber over a common routing path. When the called subscriber replies, he is connected to a called unit and conversation between the two subscribers takes place over a selected one of a number of channels between the calling and called units, these channels being common to a plurality of calling and called units.

It will be appreciated that in such an exchange it is necessary for the subscriber's line circuit to be capable of connecting a subscriber to either calling or called units and it is one object of the present invention to provide such a subscriber's line circuit.

According to the present invention, a subscriber's line circuit which is adapted to connect a subscriber to switching units of two or more types comprises an electromagnetic step-by-step switch having groups of adjacent contacts in a bank, the said switching units of each type being connected to the contacts of one of these groups, and means to cause the said switch to hunt to find a free switching unit in one of the said groups which is determined by the route over which the line circuit is caused to be operated.

A subscriber's line circuit in accordance with the present invention and which forms part of the automatic telephone exchange described in the specification of the aforesaid co-pending patent application will now be described by way of example.

This subscriber's line circuit is shown diagrammatically in the accompanying drawing but only those parts of the circuit necessary for an understanding of the present invention have been shown in this drawing, the associated equipment to which this circuit is connected being shown by blocks which are described more fully in the said copending application.

In the drawing, all electromagnetic relays and switches are shown in conventional manner, the operating windings thereof being referenced with a letter over a figure, the figure indicating the number of relay contacts or banks of switch contacts associated with the winding. The contacts or banks of contacts associated with the winding are given the same reference letter as the winding followed by a figure which is characteristic of that contact or bank of contacts. All relays and switches are shown in their unoperated position.

Referring now to the drawing, the subscriber's line 51 is connected to line terminals $LT_1$ and $LT_2$, $LT_1$ being normally connected to earth through relay contacts K1 and $LT_2$ being normally connected through relay contacts K2, the line relay winding L and the battery $BAT_1$ to earth. A uniselector having six banks of contacts S1 to S6 is arranged to be operated by a winding S and interruptor *Sdm*. Stepping of this uniselector by means of the interruptor *Sdm* may be as described on page 225 of "Telephony," volume II, by J. Atkinson. Each of the banks S1, S2, and S3 has twenty-five fixed contacts (only a few of which are shown in the drawing), the first of the contacts being the "home" contact, the next twelve being a group of Out contacts and the other twelve being a group of In contacts.

The banks S1 and S2 are for carrying speech, the wipers thereof being connected to $LT_1$ and $LT_2$ respectively, when the apparatus is in use, by the relay contacts K1 and K2. The first group of contacts, that is to say the contacts 2 to 13 of the banks S1 and S2, are connected respectively to twelve calling units 52 (only one of which is shown in the drawing). Each calling unit 52 is in all respects identical with the calling unit 15 in the aforesaid copending patent application, Serial No. 247,072, that is shown diagrammatically in Figure 1 of the copending application and the circuit for which is shown in detail in Figure 3 of the copending application. The calling unit 15 of the copending application can be used without change as a calling unit 52 of the within application. Contacts 2 to 13 of the bank S3 are connected to the corresponding calling units 52 and provide a path for control purposes as described hereinafter. In the art of automatic telephone exchanges the path 53 is sometimes referred to as a "P" or "private" wire. The second group of contacts of the banks S1, S2 and S3, that is to say the contacts 14 to 25, are connected respectively to twelve called units 56 (only one of which is shown in the drawing). Each called unit 56 is in all respects identical with the called unit 16 in the aforesaid copending patent application, Serial No. 247,072, that is shown diagrammatically in Figure 1 of the copending application and the circuit for which is shown in detail in Figure 8 of the copending application. The called unit 16 of the copending application can be used without change as a called unit 56 of the within application.

The bank S4 has an insulated home contact 54 and a homing arc $BC_1$. The bank S5 has an insulated home contact 55, an arcuate contact $BC_2$ extending over the equivalent of contacts 2 to 13 of S1, and a further arcuate contact $BC_3$ extending over the equivalent of contacts 14 to 25 on S1. Contact $BC_2$ is arranged to be connected through relay contacts Z2 to earth.

The bank S6 has an insulated home contact 57 and an arcuate contact $BC_4$ which extends over the equivalent of contacts 2 to 13 of the bank S1. The contacts 14 to 25 on this bank are each connected to the called unit 56 to which are also connected the corresponding contacts on the banks S1, S2 and S3.

The contact 58 on the bank S3 is arranged to be connected through relay contacts L1 to earth. The wiper of S3 is arranged to be connected through contacts K3 and L1 to earth; through contacts L2 and K4 to the interrupter contacts *Sdm*; and through a rectifier W1 and a meter winding M to earth.

The wiper of the bank S4 is connected through contacts L2 to contacts K4 and wiper of the bank S5.

The wiper of the bank S6 is arranged to be connected through relay contacts K7 to a router 59 which is also arranged to be connected through relay contacts K6 to a busy junction 61. Said router 59 is in all respects identical with the router 22 in the aforesaid copending patent application, Serial No. 247,072, that is shown diagrammatically in Figure 1 of the copending application and the circuit for which is shown in detail in Figures 6 and 7 of the copending application. The router 22 of the copending application can be used without change as the router 59 of the within application. Said busy junction 61 is in all respects identical with the busy junction 20 in the aforesaid copending patent application, Serial No. 247,072, that is shown diagrammatically in Figure 1 of the copending application and the circuit for which is shown in detail in Figure 11 of the copending application. The busy junction 20 of the copending application can be used without change as the busy junction 61 of the within application. The router 59 is also connected through the resistors $R_1$ and $R_2$ to the control grid of a gas-filled cold cathode triode valve V while a rectifier $W_2$ is connected between the junction of the resistors $R_1$ and $R_2$ and a pulse generator 62. Said pulse generator 62 is in all respects identical with the pulse generator 21 in the aforesaid copending patent application, Serial No. 247,072, that is shown diagrammatically in Figure 1 of the copending application and the circuit for which is shown in detail in Figure 14 of the copending application. The pulse generator 21 of the copending application can be used without change as the pulse generator 62 of the within application. The cathode lead of the valve V includes a relay winding Z and the anode of the valve V is connected to a positive supply through normally-closed contacts K5.

Considering now the operation of the circuit described above, when a subscriber 13 wishes to make a call he lifts his telephone hand set (not shown) from its rest so as to produce a short circuit across the lines 51. There is thus produced a current path from earth through the battery $BAT_1$ and the relay winding L back to earth. This line relay is therefore operated and its contacts L1 and L2 are closed.

These contacts complete the automatic stepping circuit for the uniselector, this circuit being from earth through the battery $BAT_2$, the winding S, mechanically operated contacts *Sdm*, the relay contacts K4, the relay contacts L2, the wiper and home contact 58 of the bank S3 and the contacts L1 back to earth. The uniselector is thus stepped to cause the wipers to bear against contact 2 of the banks S1, S2 and S3.

The calling units 52 are arranged so that when one of these units is in use the appropriate path 53 is connected to earth while that earth is removed when a calling unit is free. When the uniselector has moved one step, as described in the last paragraph, the operating circuit through the winding S is broken since the wiper of the bank S3 has moved off the contact 58 which is connected through the contacts L1 to earth. If, however, the calling unit connected to contacts 2 of the banks S1, S2 and S3 is in use, the earth connected over the path 53 completes the operating circuit of the uniselector which is then moved another step. Thus so long as the wiper of the bank S3 is passing over contacts which are connected to engaged calling units 52, the automatic stepping circuit of the uniselector remains completed so that the uniselector is stepped until a free calling unit 52 is reached when the motion of the uniselector is arrested.

The winding K is then energised through the circuit comprising the battery $BAT_2$, the winding S, the contacts *Sdm*, and the relay contacts L1. Resistance of the winding K is sufficiently high to prevent further operation of the stepping circuit as a result of the current flowing in the circuit of the winding K.

The relay contacts K1 and K2 thus close to connect the terminals $LT_1$ and $LT_2$ to the wipers of the banks S1 and S2. Whilst this is occurring, the seized calling unit 52 operates to put an earth on its associated path 53. Closure of the contacts K1 and K2 causes the winding L to be de-energised so that the contacts L1 and L2 open. The relay K remains operated, however, because of the earth provided over the path 53 via contacts K3 from the seized calling unit 52.

Under these conditions the subscriber's line 51 is extended from the terminals $LT_1$ and $LT_2$ to the seized calling unit 52 through the appropriate contacts of the banks S1 and S2 so that the necessary dialling impulses, and subsequent speech signals, are passed through that calling unit. The subscriber's line circuit is held in this condition until the subscriber 63 wishes to terminate the call. The loop between the lines 51 is then broken so as to indicate to the calling unit 52 that the call is ended whereupon the earth connected to the path 53 is removed so that the relay K is released. Reclosing the contacts K4 completes the energising circuit of the winding S through the contacts L2 and the homing arc BC1 so that the uniselector returns to its home position. The contacts K1 and K2 prepare the operating circuit for the relay L which may then be operated again to initiate a call as previously described.

The pulse generator 62 is arranged to supply a train of regularly recurrent positive-going pulses and the phasing of these pulses is characteristic of the subscriber 63. The signal supplied by the router 59, which is, of course, connected to a number of different subscribers' line circuits, includes a train of positive-going pulses for the purpose of identifying a subscriber to be called. The pulses supplied by the pulse generator 62 and by the router 59 are each by themselves insufficient to cause the valve V to strike. When, however, pulses supplied by the generator 62 and the router 59 occur together, the valve V1 strikes and the resulting anode current energises the winding Z. Thus when information is passed by the router 59 to the several subscribers' line circuits to which it is connected, that a call is to be set up, the relay Z in the appropriate line circuit is operated.

The contacts Z1 complete an energising circuit of the relay L and hence the relay contacts L1 and L2 close. The contacts Z2 earth the contact $BC_2$ of the uniselector bank S5.

The contacts L1 complete the circuit from earth through the home contact 58 and wiper of the uniselector bank S3, through the contacts L2, K4 and *Sdm*, the operating winding S and the battery $BAT_2$ to earth. The uniselector thus commences to hunt and the earth on the contact $BC_2$ of the bank S5 ensures that the uniselector steps over the group of Out contacts on the banks S1, S2 and S3 to the group of In contacts.

The called units 56 are arranged so that when one is in use an earth is placed on the appropriate contact of the bank S3. The uniselector thus steps over the group of In contacts until such time as a free called unit 56 is found whereupon the stepping ceases.

In similar manner to that previously described in connection with the setting up of a call originated by the subscriber 63, the relay K becomes energised through the contacts L1, the earth having been removed from the wiper of the bank S3 and hence from the contacts K4. The contacts K1 and K2 connect the line terminals $LT_1$ and $LT_2$ to the seized called unit 56.

Closure of the contacts K3 connects the winding K to the wiper of the bank S3 which is earthed and thereby ensures that the winding K remains energised from the battery $BAT_2$. Opening the normally-closed contacts K4 disconnects the moving contact of the contacts K4 from the moving contact of the contacts L2 and thus from the wiper of the bank S5 which is earthed.

Operation of the relay K also causes the normally-closed contacts K5 to be opened so as to extinguish the valve V whereupon the relay Z becomes de-energised. The contacts Z1 thus open and de-energise the relay L. The contacts L1 open and remove the direct earth from the relay winding K. The relays Z and L are, however, slow-to-release and it is arranged that the earth from the seized called unit 56 is applied over the bank S3 to hold the relay K before the contacts L1 open. Returning the contacts L2 to their normal condition prepares a homing path from earth through the bank S4.

If the subscriber's line circuit is engaged when information of a call for that subscriber is passed by the router 59, since the contacts K6 will then be closed the signal passed by the router 59 is fed to the busy junction 11. This causes the busy signal to be supplied to the calling subscriber.

It will be appreciated that in the complete exchange there are a plurality of calling units 52 and a plurality of called units 56 and communication between these units is effected cver a number of speech channels which are transmitted in time multiplex over a common path 64. It is obviously necessary to indicate to a seized called unit which of these channels is to be used through the exchange. Information as to the number of this channel is contained in the signal supplied by the router 59 and is fed to the seized called unit 56 over the contacts K7 and the appropriate contact of the bank S6.

The subscriber's line circuit described above may be modified by supplying the output from the pulse generator 62 through a resistance to the cathode of the valve V instead of feeding it together with the output from the router 59 to the control grid thereof. Such an arrangement, however, requires rather more power to be supplied by the generator 62 and the output therefrom would, of course, then consist of negative-going pulses.

I claim:

1. In an automatic telephone exchange; a subscriber's line circuit, for connecting a subscriber to switching units of a plurality of types, comprising an electromagnetic step-by-step switch having a plurality of diffrent groups of adjacent contacts in a bank, connections between the said switching units and the contacts of the bank, each group of contacts being associated with one of the types of switches and all switches of that type being connected to contacts in that group, and means to cause the said switch to hunt to find a free switching unit in one of the said groups which is determined by the route over which the line circuit is caused to be operated.

2. In an automatic telephone exchange; a subscriber's line circuit, for connecting a subscriber either to one of a first different group of switching units which are utilised during calls originating from the subscriber or to one of a second group of switching units which are utilised during calls made to that subscriber, comprising an electromagnetic step-by-step switch which has two different groups of adjacent contacts in a bank, first connections between the contacts of one of these groups of contacts and the first group of switching units one to one, second connections between the contacts of the other group of contacts and the second group of switching units one to one, and means to cause the said switch to hunt in the first group of contacts to find a free switching unit on the first group thereof if the subscriber connected to the line circuit applies a calling condition and to hunt in the second group of contacts to find a free switching unit in the second group thereof if the subscriber is being called through the exchange.

3. In an automatic telephone exchange; a subscriber's line circuit, for connecting a subscriber either to one of a first group of switching units which are utilised during calls originating from the subscriber or to one of a second group of switching units which are utilised during calls made to that subscriber, comprising an electromagnetic step-by-step switch which has two groups of adjacent contacts in a bank, first connections between the contacts of one of these groups of contacts and the first group of switching units one to one, second connections between the contacts of the other group of contacts and the second group of switching units one to one, a line relay operable in dependence upon the subscriber connected to the line circuit applying a calling condition, means to cause the said switch to hunt to find a free switching unit when said line relay is operated, a further relay operable in dependence upon the subscriber being called through the exchange, connections between the further relay and the line relay to cause the line relay to be operated upon operation of the further relay, and connections between the further relay and the said switch to apply a condition to the switch upon operation of the further relay whereby when hunting commences the switch is stepped over all the contacts of the first group thereof and the swicth then hunts to find a free switching unit in the second group thereof.

4. A subscriber's line circuit according to claim 3 wherein the said further relay is connected in circuit with an electronic valve which is arranged to be conductive so as to operate the relay only when two electrical pulses are supplied simultaneously thereto, one of these pulses being supplied continuously as a train of pulses to the valve while the other is arranged to be supplied from switching apparatus in the exchange.

5. A subscriber's line circuit according to claim 4 wherein the electronic valve is of the cold cathode type.

6. A subscriber's line circuit according to claim 3 wherein the said further relay has contacts connected in circuit with a sector of a bank of the said switch, this sector corresponding to the first group of contacts of the first mentioned bank, and a stepping circuit completed when the further relay is operated for stepping the switch over the first group of contacts to the second group.

7. In an automatic telephone exchange comprising a plurality of calling units for connection to calling subscribers, a plurality of called units for connection to called subscriber, a plurality of speech channels for connection between the calling and called units, a plurality of subscriber's line circuits associated one with each subscriber for connecting the subscriber to either a free calling unit or a free called unit, and a router for setting up each of said channels between a calling unit to which a calling subscriber is connected through the associated subscriber's line circuit and a called unit to which a called subscriber is connected through the associated subscriber's line circuit; each subscriber's line circuit comprising an electromagnetic step-by-step switch which has two different groups of adjacent contacts in a bank, first connections between the contacts of one of these groups of contacts and the calling units one to one, second connections between the contacts of the other group of contacts and the called units one to one, and means to cause said switch to hunt in the first group of contacts to find a free calling unit if the subscriber connected to the line circuit applies a calling condition and to hunt in the second group of contacts to find a free called unit if the subscriber is being called through the exchange.

8. In an automatic telephone exchange comprising a plurality of calling units for connection to calling subscribers, a plurality of called units for connection to called subscribers, a plurality of speech channels for connection between the calling and called units, a plurality of subscriber's line circuits associated one with each subscriber for connecting the subscriber to either a free calling unit or a free called unit, a router for setting up each channel between a calling unit to which a calling subscriber is connected through the associated subscriber's line circuit and a called unit to which a called subscriber is connected through the associated subscriber's line circuit, connections between the router and each subscriber's line circuit over which is arranged to be supplied from the router to the subscriber's line circuit when a call is being set up, a train of pulses which have a phasing that is characteristic of that subscriber's line circuit, and a pulse generator which is arranged to supply to all the subscriber's line circuits a single signal containing in time multiple the separate trains of pulses which may be supplied by the router; each subscriber's line circuit comprising an electromagnetic step-by-step switch which has two different groups of adjacent contacts in a bank, first connections between the contacts of one of these groups of contacts and the calling units one to one, second connections between the contacts of the other group of contacts and the called units one to one, a line relay which is arranged to be operated in dependence upon the subscriber connected to the line circuit applying a calling condition, means to cause the said switch to hunt to find a free unit when said line relay is operated, an electronic valve which is arranged to be conductive only when pulses in the said signal supplied by the pulse generator and pulses supplied by the router are simultaneously applied thereto, a further relay connected in circuit with said electronic valve and arranged to be operated only when that valve is conductive, connections between the further relay and the line relay to cause the line relay to be operated upon operation of the further relay, and connections between the further relay and the said switch to apply a condition to the switch upon operation of the further relay whereby when hunting commences the switch is stepped over the contacts of the first group thereof and the switch then hunts to find a free called unit.

9. In an automatic telephone exchange; a subscriber's line circuit for connecting a subscriber to switching units of two-types, comprising an electromagnetic step-by-step switch having two groups of adjacent contacts in a bank, connections between the said switching units and the contacts of the bank, each group of contacts being associated with one of the types of switches and all switches of that type being connected to contacts in that group, means to cause the said switch to hunt to find a free switching unit in one of said groups when the line circuit is caused to be operated over a first route, and means to cause the said switch to hunt to find a free switching unit in the other group when the line circuit is caused to be operated over a second route.

10. In an automatic telephone exchange; a subscriber's line circuit for connecting a subscriber either to one of a first group of switching units which are utilised during calls originating from the subscriber or to one of a second group of switching units which are utilised during calls made to that subscriber, comprising an electromagnetic step-by-step switch which has a stepping mechanism and which has two groups of adjacent contacts in a bank, first connections between the contacts of one of these groups of contacts and the first group of switching units one to one, second connections between the contacts of the other group of contacts and the second group of switching units one to one, means to operate the stepping mechanism to cause said switch to hunt in the first group of contacts to find a free switching unit of the first group thereof when the subscriber connected to the line circuit applies a calling condition, and means to operate the stepping mechanism to cause the said switch to hunt in the second group of contacts to find a free switching unit of the second group thereof when the subscriber is being called through the exchange.

References Cited in the file of this patent

UNITED STATES PATENTS

| | | |
|---|---|---|
| 1,319,031 | Aldendorff | Oct. 14, 1919 |
| 1,632,009 | Lomax | June 14, 1927 |
| 2,295,200 | Cesareo | Sept. 8, 1942 |
| 2,299,514 | Taylor | Oct. 20, 1942 |
| 2,424,519 | Taylor et al. | July 22, 1947 |